US012810723B2

(12) United States Patent
Qian

(10) Patent No.: US 12,810,723 B2
(45) **Date of Patent: *Nov. 24, 2026**

(54) METHOD OF CONTROLLING TRAFFIC FLOW USING WEATHER CONDITION AND SYSTEM PERFORMING THE SAME

(71) Applicant: Wuyang Qian, Nantong (CN)

(72) Inventor: Wuyang Qian, Nantong (CN)

( * ) Notice: Subject to any disclaimer, the term of this patent is extended or adjusted under 35 U.S.C. 154(b) by 158 days.

This patent is subject to a terminal disclaimer.

(21) Appl. No.: 18/942,701

(22) Filed: Nov. 10, 2024

(65) Prior Publication Data

US 2025/0069502 A1 Feb. 27, 2025

Related U.S. Application Data

(63) Continuation-in-part of application No. 17/752,624, filed on May 24, 2022, now Pat. No. 12,175,864.

(51) Int. Cl.
*G08G 1/095* (2006.01)
*G08G 1/07* (2006.01)

(52) U.S. Cl.
CPC ............... *G08G 1/095* (2013.01); *G08G 1/07* (2013.01)

(58) Field of Classification Search
CPC ................................. G08G 1/095; G08G 1/07
USPC .......................................................... 340/907
See application file for complete search history.

(56) References Cited

U.S. PATENT DOCUMENTS 6,693,555 B1 * 2/2004 Colmenarez ..... G08G 1/096716 340/602
10,490,066 B2 11/2019 Green et al.
12,175,864 B2 * 12/2024 Qian ........................ G01S 17/86
2006/0181433 A1 * 8/2006 Wolterman ............ G08G 1/164 340/905
2011/0175753 A1 * 7/2011 Free ......................... G08G 1/08 901/50
2016/0189540 A1 * 6/2016 Fowe ................... G08G 1/0129 701/70
2018/0096595 A1 4/2018 Janzen et al.
2018/0190111 A1 * 7/2018 Green .................... G06N 20/00
2019/0035262 A1 * 1/2019 Brady .................... G08G 1/005
2020/0293796 A1 9/2020 Mohammadabadi et al.
2021/0233396 A1 * 7/2021 Guo ........................ G08G 1/081
2021/0334550 A1 10/2021 Cho et al.
2022/0017088 A1 * 1/2022 Heikal ................... G08G 1/017
2023/0276209 A1 * 8/2023 Knopp .................. H04W 4/027 370/259
2023/0306843 A1 * 9/2023 Knopp ...................... G08G 1/22
2024/0355200 A1 * 10/2024 Kenig .................... G06V 20/54

FOREIGN PATENT DOCUMENTS

CA 2232739 * 11/1999
CA 2232739 A1 * 11/1999 ............. G08G 1/052

* cited by examiner

*Primary Examiner* — Jack K Wang
(74) *Attorney, Agent, or Firm* — Chen-Chi Lin

(57) ABSTRACT

A method controls traffic at an intersection having three or more branches. The method comprising the steps of: capturing image data by a plurality of camera units positioned at the intersection; sending the image data to a control unit; determining from the image data a plurality of variables; and based on the plurality of variables, determining speed limits, and setting orders and durations of lights of a plurality of traffic lights positioned at the intersection. A system performs the method.

14 Claims, 5 Drawing Sheets

METHOD OF CONTROLLING TRAFFIC FLOW USING WEATHER CONDITION AND SYSTEM PERFORMING THE SAME

CROSS-REFERENCE TO RELATED APPLICATIONS

This patent application is a Continuation-in-part application of U.S. patent application Ser. No. 17/752,624. The Disclosure made in US Patent Application Publication No. 2023/0386329 to Qian, the Disclosure made in U.S. Pat. No. 10,490,066 to Green et al., the Disclosure made in US Patent Application Publication No. 2021/0334550 to Cho et al., the Disclosure made in US Patent Application Publication No. 2020/0293796 to Mohammadabadi et al., and the Disclosure made in US Patent Application Publication No. 2018/0096595 to Janzen et al. are hereby incorporated by reference.

FIELD OF THE INVENTION

This invention relates generally to a method for controlling traffic using weather condition. More particularly, the present invention relates to a method for controlling traffic using weather condition and a system performing the method.

BACKGROUND OF THE INVENTION

U.S. Pat. No. 10,490,066 to Green et al. discloses the use of sensor systems such as light detection and ranging (LiDAR) systems and color cameras such as red green blue (RGB) cameras to determine traffic data, such as the number of vehicles at a crossing, the number of vehicles turning, and the paths taken by the vehicles. US Patent Application Publication No. 2021/0334550 to Cho et al. discloses an artificial intelligent (AI) algorithm implemented by hardware circuit or software. The AI algorithms classify and label at least one vehicle in the image. US Patent Application Publication No. 2020/0293796 to Mohammadabadi et al. discloses machine learning algorithms being trained to compute information corresponding to an intersection such as intersection bounding boxes, coverage maps, attributes, and distances. US Patent Application Publication No. 2018/0096595 to et al. discloses detection of the presence of emergency vehicles based upon the captured audio data by performing a classification process.

Advantages of instant disclosure include adjustment of speed limit using weather condition; reduction of the number of right-angle collisions at an intersection; lower cost than those traffic controlling methods using in-ground inductive position sensors; and smoother traffic flows.

SUMMARY OF THE INVENTION

This invention discloses a method for controlling traffic at an intersection comprising three or more branches. The method comprising the steps of: capturing image data by a plurality of camera units positioned at the intersection; sending the image data to a control unit; determining from the image data a plurality of variables; and based on the plurality of variables, determining speed limits, and setting orders and durations of lights of a plurality of traffic lights positioned at the intersection.

DETAILED DESCRIPTION OF THE INVENTION

Figure 1:
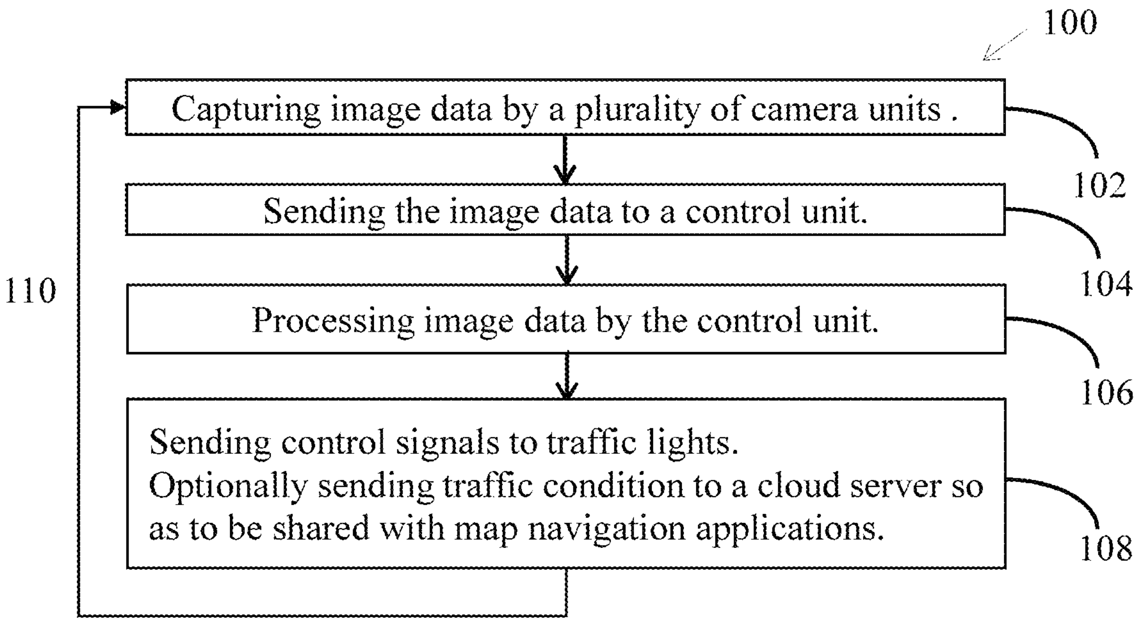
FIG. 1 is a flowchart of a method for controlling traffic at an intersection in examples of the present disclosure.

FIG. 1 is a flowchart of a method 100 for controlling traffic at an intersection in examples of the present disclosure. The intersection comprises three or more branches. For one example, an intersection 200 of FIG. 2 comprises three branches including a first branch 220, a second branch 240, and a third branch 260. The intersection 200 further comprises a plurality of road signs 212. For another example, an intersection 300 of FIG. 3 comprises four branches including a first branch 320, a second branch 340, a third branch 360, and a fourth branch 380. The method 100 may begin in block 102.

Figure 2:
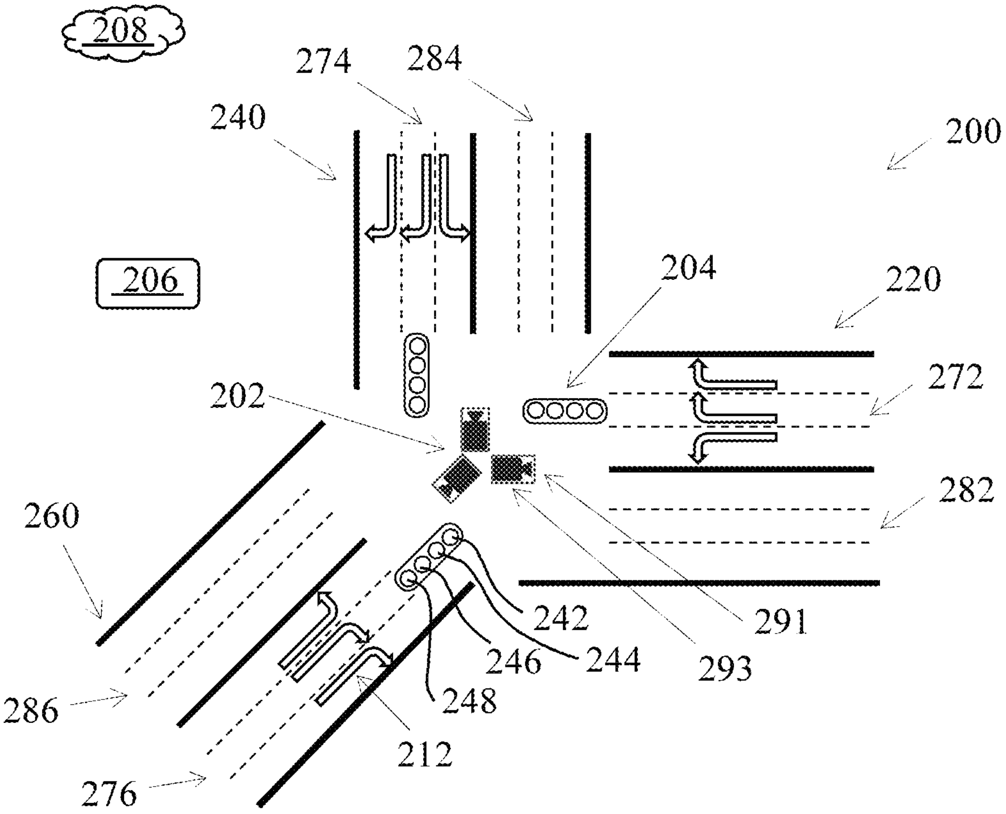
FIG. 2 shows an intersection with three branches in examples of the present disclosure.

In block 102, image data of each incoming direction (for example, each of incoming direction 272, incoming direction 274, and incoming direction 276 of FIG. 2) of the three or more branches are captured by a plurality of camera units (for example, a plurality of camera units 202 of FIG. 2) positioned at the intersection. In one example, the commands to capture image data are sent from a control unit 206 to the plurality of camera units 202 and the image data comprises streaming image data. In examples of the present disclosure, each of the plurality of camera units 202 comprises a red-green-blue (RGB) photographic camera 291 and a light detection and ranging (LiDAR) depth camera 293.

In examples of the present disclosure, license plate numbers of vehicles appeared in the videos or images may be removed by an AI algorithm. The videos or images may be used for traffic violation citations or as evidences for court proceedings. Block 102 may be followed by block 104.

In block 104, the captured image data of each incoming direction are sent to the control unit 206. Block 104 may be followed by block 106.

In block 106, the image data are processed by the control unit 206. Block 106 may be followed by block 108.

In block 108, switching-on timing, on-duration, switching-off timing, and off-duration of each light of a plurality of traffic lights 204 are predetermined. The switching-on timing, on-duration, switching-off timing, and off-duration of each light of the plurality of traffic lights 204 are then adjusted based at least on control signals sent from the control unit 206 to the plurality of traffic lights 204. For one example, each of the plurality of traffic lights comprises a red light, a yellow light, and a green light. For another example, each of the plurality of traffic lights 204 comprises a red light 242, a yellow light 244, a green light 246, and a left-turn light 248.

In examples of the present disclosure, traffic condition is sent to a cloud server 208 of FIG. 2 so as to be shared with map navigation applications (APPs). Block 108 may be followed by block 102 so as to form a loop 110.

Figure 3:
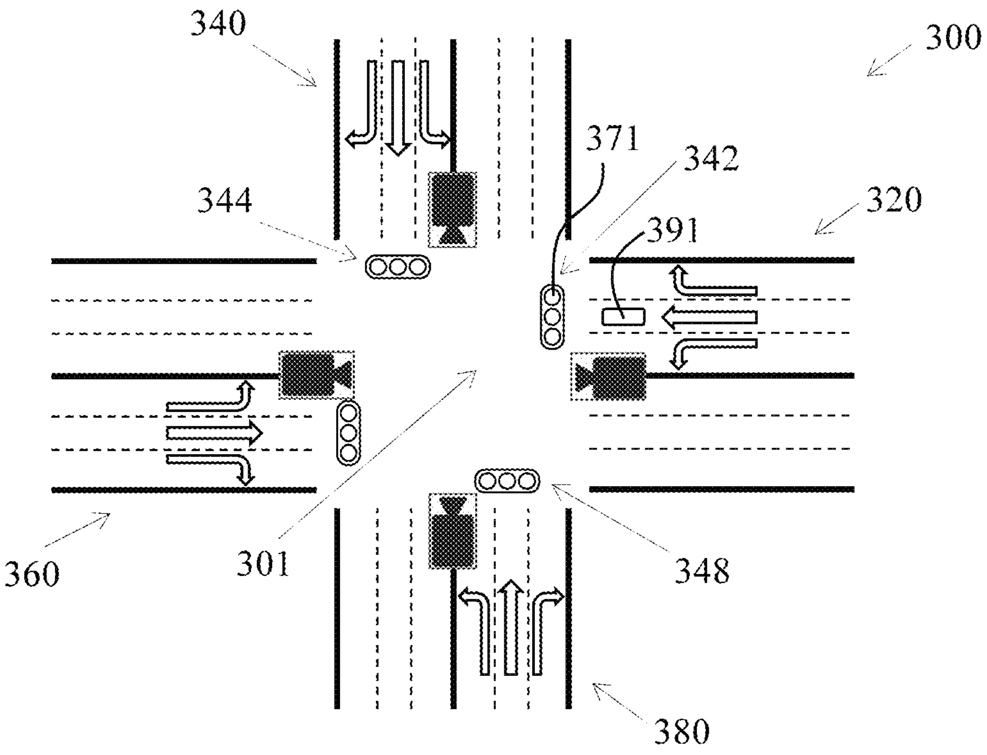
FIG. 3 shows an intersection with four branches in examples of the present disclosure.
Figure 4:
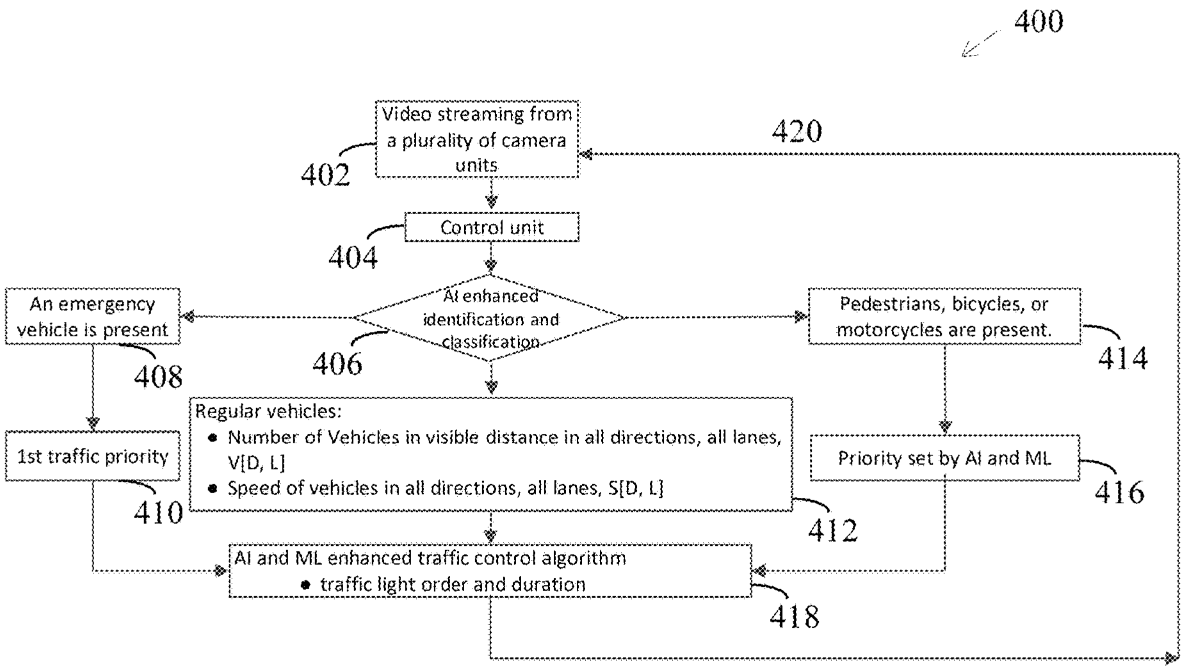
FIG. 4 is a flowchart of a method for controlling traffic at an intersection in examples of the present disclosure.

FIG. 4 is a flowchart of a method 400 for controlling traffic at an intersection in examples of the present disclosure. The intersection comprises three or more branches. For one example, an intersection 200 of FIG. 2 comprises three branches including a first branch 220, a second branch 240, and a third branch 260. For another example, an intersection 300 of FIG. 3 comprises four branches including a first branch 320, a second branch 340, a third branch 360, and a fourth branch 380. The method 400 may begin in block 402.

In block 402, image data of each incoming direction (for example, each of incoming direction 272, incoming direction 274, and incoming direction 276 of FIG. 2) of the three or more branches are captured by a plurality of camera units (for example, a plurality of camera units 202 of FIG. 2) positioned at the intersection. In one example, the commands to capture image data are sent from a control unit 206 to the plurality of camera units 202 and the image data comprises streaming image data. In examples of the present disclosure, each of the plurality of camera units 202 comprises an RGB photographic camera 291 and a LiDAR depth camera 293.

In examples of the present disclosure, image data of each outgoing direction (for example, each of outgoing direction 282, outgoing direction 284, and outgoing direction 286 of FIG. 2) of the three or more branches are captured by the plurality of camera units (for example, a plurality of camera units 202 of FIG. 2) positioned at the intersection. Block 402 may be followed by block 404.

In block 404, the captured image data of each incoming direction are sent to the control unit 206. In examples of the present disclosure, the captured image data of each incoming direction and each outgoing direction are sent to the control unit 206. Block 404 may be followed by block 406.

In block 406, the image data are processed by the control unit 206. Artificial intelligent (AI) enhanced identification and classification are determined. Block 406 may be followed by block 408, block 412, or block 414.

In block 408, from the image data of each incoming direction, it is determined that an emergency vehicle 391 of FIG. 3 is present. In one example, the emergency vehicle is an ambulance. In another example, the emergency vehicle is a fire engine. In still another example, the emergency vehicle is a police car. In examples of the present disclosure, one or more emergency flashlights or one or more sirens in the images or in the streaming videos are further used to classify if the emergency vehicle is as an ambulance, a fire engine, or a police car. Block 408 may be followed by block 410.

In block 410, the emergency vehicle 391 of FIG. 3 has the first (highest) priority. Because the emergency vehicle 391 is present, on-duration of a green light 371 of FIG. 3 of a traffic light 342 of FIG. 3 facing the emergency vehicle 391 is increased until the emergency vehicle 391 at least enters a center portion 301 of FIG. 3 of the intersection 300 of FIG. 3. Block 404 may be followed by block 406. If when the emergency vehicle 391 is detected, the green light 371 is off, then the green light 371 will be switched on and the red light of a traffic light 344 and the red light of a traffic light 348 will be switched on. In examples of the present disclosure, because an emergency vehicle 391 of FIG. 3 is present, the green light 371 of the traffic light 342 facing the emergency vehicle is flashing at a predetermined frequency so as to warn other vehicles to yield to the emergency vehicle 391. In one example, the predetermined frequency is 2 Hertz when the emergency vehicle 391 is not blocked by other vehicles. In another example, the predetermined frequency is 5 Hertz when the emergency vehicle 391 is blocked by another vehicle. Block 410 may be followed by block 418.

Figure 5:
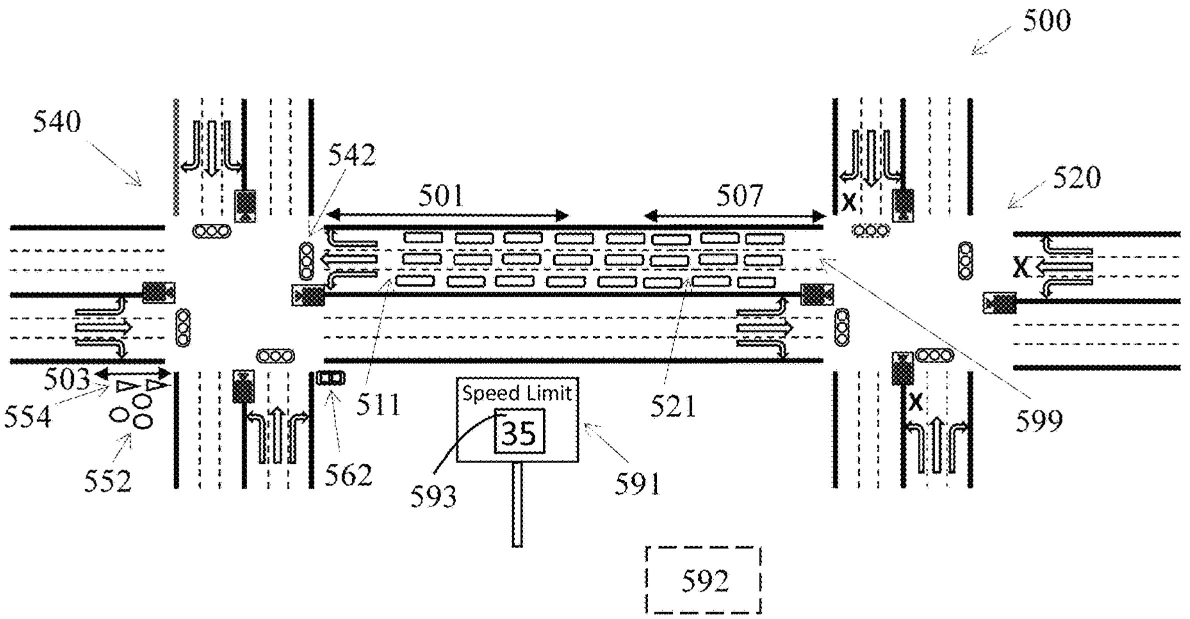
FIG. 5 shows two intersections in examples of the present disclosure.

In block 412, from the image data of each incoming direction, a respective number of a plurality of vehicles 511 of FIG. 5 in each incoming direction of the three or more branches within a predetermined distance 501 of FIG. 5 and a respective speed of each of the plurality of vehicles 511 are determined. FIG. 5 shows two intersections 500 in examples of the present disclosure. The two intersections 500 comprises a first intersection 520 and a second intersection 540.

In examples of the present disclosure, a speed limit is determined using a weather condition. The determined speed limit is then displayed on a speed limit sign 591. In one example, the speed limit sign 591 comprises an electronic display 593. Though the electronic display 593 of FIG. 5 shows 35 miles per hour, the speed limit may vary. In one example, there is a default speed limit [for example, 35 miles per hour (MPH)]. The speed limit is a predetermined value [for example, 10 miles per hour] lower than a default speed limit when the weather condition is raining. The speed limit is a predetermined value [for example, 20 miles per hour] lower than a default speed limit when the weather condition is foggy.

In one example, the weather condition is determined from the image data. In another example, the weather condition is from a weather station 592 (shown in dashed lines).

The respective speed of each of the plurality of vehicles 511 of FIG. 5 is compared with the speed limit. In response to a determination that a speed of a speeding vehicle is above the speed limit, flashing a yellow light, a red light, or the yellow light and the red light of a selected traffic light 542 of FIG. 5 facing the speeding vehicle. In one example, the flashing frequency is 1 Hertz when the speed of the speeding vehicle is less than 5 MPH above the predetermined speed limit. In another example, the flashing frequency is 2 Hertz when the speed of the speeding vehicle is less than 10 MPH above the predetermined speed limit. In still another example, the flashing frequency is 3 Hertz when the speed of the speeding vehicle is less than 15 MPH above the predetermined speed limit. In yet still another example, the flashing frequency is 4 Hertz when the speed of the speeding vehicle is more than 15 MPH above the predetermined speed limit.

From the image data of each outgoing direction, a respective number of a plurality of outgoing vehicles 521 of FIG. 5 in each outgoing direction of the three or more branches within another predetermined distance 507 of FIG. 5 and a respective speed of each of the plurality of outgoing vehicles 521 are determined. Determine if a traffic jam condition is present when the respective number of the plurality of outgoing vehicles 521 is larger than a predetermined number and the respective speed of each of the plurality of outgoing vehicles 521 is smaller than a predetermined speed threshold. In one example, the predetermined speed threshold is 0 MPH. In another example, the predetermined speed threshold is 5 MPH. In still another example, the predetermined speed threshold is 10 MPH. In yet still another example, the predetermined speed threshold is 15 MPH. In response to a determination that the traffic jam condition is present for an outgoing direction 599 of FIG. 5, reducing on-duration of a green light of each traffic light allowing vehicles entering the outgoing direction 599 (see the three “X” mark in FIG. 5). Sending information of the traffic jam condition to a cloud server 208 of FIG. 2 so that a map with road conditions is updated and users of the map are notified. Block 412 may be followed by block 418.

In block 414, from the image data of each incoming direction, it is determined that pedestrians 552 of FIG. 5 or bicycles 554 of FIG. 5 are present at the intersection. A respective number of a plurality of pedestrians 552 and bicycles 554 in each incoming direction and each outgoing direction of the three or more branches within another predetermined distance 503 of FIG. 5 are determined. The predetermined distance 503 is shorter than the predetermined distance 501.

In examples of the present disclosure, the on-duration of green light will be extended by an additional time determined by an AI algorithm. This extension is applied when the AI algorithm, using captured images, detects the presence of an abnormally slow moving vehicle, e.g., having one or more flat tires, at the intersection. In examples of the present disclosure, the on-duration of a pedestrian crossing signal at a traffic light is extended by an additional time determined by an AI algorithm. This extension is applied when the AI algorithm, using captured images, detects the presence of a pedestrian at the intersection, using assistant equipment. The assistant equipment includes crutches and wheelchairs. In above examples, the traffic light condition remains unchanged until the slow moving object completes the crossing.

Block 414 may be followed by block 416.

In block 416, priority of pedestrians' and bicycles' passing the streets are determined by AI and machine learning (ML) algorithm. Based at least on the respective number of the plurality of pedestrians 552 and bicycles 554, determine a plurality of cycles of switching-on timing and on-duration of each light of a plurality of pedestrian traffic lights 562 positioned at the intersection 540. Block 416 may be followed by block 418.

In block 418, traffic light orders and durations are determined by AI and ML algorithms. Block 418 may be followed by block 402 so as to form a loop 420.

Those of ordinary skill in the art may recognize that modifications of the embodiments disclosed herein are possible. For example, a number of cameras positioned at an intersection may vary. Other modifications may occur to those of ordinary skill in this art, and all such modifications are deemed to fall within the purview of the present invention, as defined by the claims.

The invention claimed is:

1. A method for controlling traffic at an intersection comprising three or more branches, the method comprising the steps of:

capturing by a plurality of camera units positioned at the intersection, image data of each incoming direction of the three or more branches;

sending the image data of each incoming direction to a control unit;

determining from the image data of each incoming direction, a respective number of a plurality of vehicles in each incoming direction of the three or more branches within a predetermined distance and a respective speed of each of the plurality of vehicles;

determining based at least in part on the respective number of the plurality of vehicles and the respective speed, a plurality of cycles of switching-on timing and on-duration of each light of a plurality of traffic lights positioned at the intersection;

determining a speed limit using a weather condition;

displaying the speed limit on a speed limit sign;

comparing the respective speed of each of the plurality of vehicles with the speed limit; and in response to a determination that a speed of a speeding vehicle is above the speed limit, flashing a yellow light, flashing a red light, or flashing the yellow light and the red light of a selected traffic light facing the speeding vehicle;

wherein the yellow light, the red light, or the yellow light and the red light are flashing at a first frequency when the speed of the speeding vehicle is below a first threshold speed;

wherein the yellow light, the red light, or the yellow light and the red light are flashing at a second frequency when the speed of the speeding vehicle is between the first threshold speed and a second threshold speed;

wherein the yellow light, the red light, or the yellow light and the red light are flashing at a third frequency when the speed of the speeding vehicle is between the second threshold speed and a third threshold speed;

wherein the second threshold speed is higher than the first threshold speed;

wherein the third threshold speed is higher than the second threshold speed;

wherein the first frequency is smaller than the second frequency; and wherein the second frequency is smaller than the third frequency.

2. The method of claim 1, wherein the weather condition is determined from the image data.

3. The method of claim 1, wherein the weather condition is from a weather station.

4. The method of claim 1, wherein the speed limit is a predetermined value lower than a default speed limit when the weather condition is raining.

5. The method of claim 1, wherein the speed limit is a predetermined value lower than a default speed limit when the weather condition is foggy.

6. A system comprising a plurality of camera units positioned at an intersection comprising three or more branches;

a plurality of traffic lights positioned at the intersection; and a control unit;

wherein the system is configured to perform functions to:

capture by the plurality of camera units, image data of each incoming direction of the three or more branches;

send the image data of each incoming direction to the control unit;

determine from the image data of each incoming direction, a respective number of a plurality of vehicles in each incoming direction of the three or more branches within a predetermined distance and a respective speed of each of the plurality of vehicles;

determine based at least in part on the respective number of the plurality of vehicles and the respective speed, a plurality of cycles of switching-on timing and on-duration of each light of the plurality of traffic lights;

determine a speed limit using a weather condition;

display the speed limit on a speed limit sign;

compare the respective speed of each of the plurality of vehicles with the speed limit; and in response to a determination that a speed of a speeding vehicle is above the speed limit, flash a yellow light, flash a red light, or flash the yellow light and the red light of a selected traffic light facing the speeding vehicle;

wherein the yellow light, the red light, or the yellow light and the red light are flashing at a first frequency when the speed of the speeding vehicle is below a first threshold speed;

wherein the yellow light, the red light, or the yellow light and the red light are flashing at a second frequency when the speed of the speeding vehicle is between the first threshold speed and a second threshold speed;

wherein the yellow light, the red light, or the yellow light and the red light are flashing at a third frequency when the speed of the speeding vehicle is between the second threshold speed and a third threshold speed;

wherein the second threshold speed is higher than the first threshold speed;

wherein the third threshold speed is higher than the second threshold speed;

wherein the first frequency is smaller than the second frequency; and wherein the second frequency is smaller than the third frequency.

7. The system of claim 6, wherein the weather condition is determined from the image data.

8. The system of claim 6, wherein the weather condition is from a weather station.

9. The system of claim 6, wherein the speed limit is a predetermined value lower than a default speed limit when the weather condition is raining.

10. The system of claim 6, wherein an on-duration of a pedestrian crossing signal at a selected traffic light of the plurality of traffic lights is extended by an additional time determined by an artificial intelligent (AI) algorithm; and wherein the additional time is extended when the AI algorithm, using the image data, detects a presence of a pedestrian, using assistant equipment, at the intersection.

11. A non-transitory computer-readable storage medium storing instructions that, when executed by one or more processors of a control unit, cause the control unit to perform the steps of:

instructing a plurality of camera units positioned at an intersection comprising three or more branches to capture image data of each incoming direction of the three or more branches;

sending the image data of each incoming direction to the control unit;

determining from the image data of each incoming direction, a respective number of a plurality of vehicles in each incoming direction of the three or more branches within a predetermined distance and a respective speed of each of the plurality of vehicles;

determining based at least in part on the respective number of the plurality of vehicles and the respective speed, a plurality of cycles of switching-on timing and on-duration of each light of a plurality of traffic lights positioned at the intersection;

determining a speed limit using a weather condition;

displaying the speed limit on a speed limit sign;

comparing the respective speed of each of the plurality of vehicles with the speed limit; and in response to a determination that a speed of a speeding vehicle is above the speed limit, flashing a yellow light, flashing a red light, or flashing the yellow light and the red light of a selected traffic light facing the speeding vehicle;

wherein the yellow light, the red light, or the yellow light and the red light are flashing at a first frequency when the speed of the speeding vehicle is below a first threshold speed;

wherein the yellow light, the red light, or the yellow light and the red light are flashing at a second frequency when the speed of the speeding vehicle is between the first threshold speed and a second threshold speed;

wherein the yellow light, the red light, or the yellow light and the red light are flashing at a third frequency when the speed of the speeding vehicle is between the second threshold speed and a third threshold speed;

wherein the second threshold speed is higher than the first threshold speed;

wherein the third threshold speed is higher than the second threshold speed;

wherein the first frequency is smaller than the second frequency; and wherein the second frequency is smaller than the third frequency.

12. The non-transitory computer-readable storage medium of claim 11, wherein the weather condition is determined from the image data.

13. The non-transitory computer-readable storage medium of claim 11, wherein the weather condition is from a weather station.

14. The non-transitory computer-readable storage medium of claim 11, wherein the speed limit is a predetermined value lower than a default speed limit when the weather condition is raining.

* * * * *